United States Patent
Weirich

(10) Patent No.: US 6,741,040 B2
(45) Date of Patent: May 25, 2004

(54) OPERATING DEVICE FOR LAMPS WITH A REGULATED SEPIC CONVERTER

(75) Inventor: Michael Weirich, Unterhaching (DE)

(73) Assignee: Patent-Treuhand-Gesellschaft für elektrische Glühlampen mbH, Munich (DE)

( * ) Notice: Subject to any disclaimer, the term of this patent is extended or adjusted under 35 U.S.C. 154(b) by 0 days.

(21) Appl. No.: 10/367,792

(22) Filed: Feb. 19, 2003

(65) Prior Publication Data

US 2003/0155872 A1 Aug. 21, 2003

(30) Foreign Application Priority Data

Feb. 20, 2002 (DE) .......................................... 102 07 105

(51) Int. Cl.⁷ .............................................. H05B 37/02
(52) U.S. Cl. .................. 315/219; 315/224; 315/DIG. 5
(58) Field of Search ................................ 315/219, 224, 315/DIG. 5, DIG. 7

(56) References Cited

U.S. PATENT DOCUMENTS

| 5,214,355 A | * | 5/1993 | Nilssen | ........................ 315/219 |
| 5,313,142 A | * | 5/1994 | Wong | .......................... 315/205 |
| 5,705,894 A | | 1/1998 | Krummel | |

* cited by examiner

*Primary Examiner*—David Vu

(57) ABSTRACT

The invention relates to a novel operating device for lamps, in particular low-pressure gas discharge lamps, in which a SEPIC converter is used for charging a storage transistor from an AC voltage supply. In this case, the SEPIC converter is regulated to an output quantity as regulated variable, its operating frequency being altered. Preferably, only the switch-on time and not the switch-off time of the switching transistor of the SEPIC converter is altered in this case.

16 Claims, 1 Drawing Sheet

OPERATING DEVICE FOR LAMPS WITH A REGULATED SEPIC CONVERTER

TECHNICAL FIELD

The present invention relates to an electronic operating device for supplying lamps, which, for its part, is supplied with AC voltage.

This encompasses, on the one hand, operating devices for individual lamps but also, on the other hand, operating devices which can supply a plurality of lamps.

In many operating devices of this type, a storage capacitor has to be charged from the AC voltage and supplies downstream circuit sections with DC voltage. To that end, the AC voltage, usually oscillating between two polarities, can be rectified and applied as unipolar AC voltage to the capacitor. However, this has the serious disadvantage that the capacitor is charged from the AC voltage only when the instantaneous voltage value of the AC voltage is higher than the voltage across the capacitor. There arise, therefore, momentary pulsed charging surges in the vicinity of the voltage maxima of the AC supply voltage. These surge-like charging currents contain a regularly impermissibly strong harmonic spectrum. Special converter circuits are used for correction (so-called power factor correction (PFC)).

PRIOR ART

A known design of such a converter circuit is referred to as a step-up converter. One example is found in WO 96/03017. This solution has the advantage of good efficiencies and can be realized relatively inexpensively and simply. However, it has the disadvantage firstly that, in principle, it can only generate DC voltages which are greater than the AC supply voltage amplitude. Secondly, these converters generate relatively strong radio interference. What is critical is primarily the fundamentally governed lower limit for the DC voltage of the storage capacitor, which is highly disturbing with regard to the required dielectric strength of said capacitor and the downstream circuit sections that it supplies, and thus with regard to the circuit costs.

By contrast, in the case of a so-called SEPIC converter, the DC voltage with which the storage capacitor is charged can be set arbitrarily within relatively wide limits and, in particular, may also be smaller than the voltage amplitude of the AC supply voltage. On the other hand, this converter principle requires a number of additional components. In the case of the SEPIC converter, what is primarily of interest is the so-called intermittent operation in which the individual charging and discharging phases of the two inductances provided in said converter are separated by currentless times. The SEPIC converter is conventionally controlled by a fixed-frequency regulating circuit. The need for the desired current consumption waveform to be tracked by the duty ratio is obviated. Thus, the control circuit of the SEPIC converter is fundamentally simpler than in the case of the previously described step-up converter.

Both circuit concepts are familiar to the person skilled in the art and need not be explained in detail here. With regard to the functioning of the SEPIC converter, however, reference is supplementarily made to the following description of the invention.

SUMMARY OF THE INVENTION

The present invention is based on the technical problem of providing an improved electronic operating device for lamps with a SEPIC converter. According to the invention, it is provided for this purpose that the electronic operating device has a storage capacitor, a SEPIC converter for charging the storage capacitor from the AC voltage to a DC voltage in the case of an operating device current consumption which is essentially tracked to the AC voltage waveform with an operating frequency, and a regulating circuit for regulating the SEPIC converter to an output quantity, characterized in that the regulating circuit alters the operating frequency of the SEPIC converter during regulation.

Refinements of the invention emerge from the dependent claims.

The essential aspect of the invention resides in the SEPIC converter of the operating device not being controlled in a fixed-frequency manner, but rather the operating frequency thereof being altered, for the purpose of regulation, to an output quantity of the SEPIC converter as regulated variable. The output quantity might be for example the output voltage of the SEPIC converter, which charges the storage capacitor. In principle, however, a different output quantity of the converter or downstream circuit sections is also appropriate.

It has been conventional practice for the duty ratio to be altered during regulation, but the frequency to be kept fixed. By way of example, with a decreasing supply voltage amplitude (mains power supply voltage fluctuations), the switch-on time of the switching transistor of the SEPIC converter has been increased and the switch-off time decreased, the overall period having remained unchanged. It has thus been possible to obtain a constant output voltage despite mains power supply voltage fluctuations.

However, the inventors assume that the fixed-frequency driving of the switching transistor is highly unfavorable with regard to the line-conducted interference of the operating device. Therefore, according to the invention, the operating frequency of the switching transistor is to be altered during the regulation of the output quantity, so that the line-conducted interference is distributed over a certain frequency range in the time profile.

The switch-on time of the switching transistor of the SEPIC converter is preferably intended to be altered in this case. As a result, the regulation can thus be effected by way of an alteration of the switch-on time of the switching transistor and the resultant operating frequency alteration. Furthermore, the switch-off time of the switching transistor is again preferably intended to remain constant. This has the additional advantage that the switch-off time can be optimized in such a way as to ensure the intermittent operation which is preferred according to the invention. Thus, the switch-on time is preferably the (sole) manipulated variable.

The intermittent operation presupposes an, albeit short, currentless phase (in a diode in series with the storage capacitor) between the charging and discharging pulses of the inductances of the SEPIC converter. The discharging pulses belong to the switch-off time of the switching transistor. Since regulation to a constant output voltage is normally effected, the discharge behavior is not subjected to any significant fluctuations, so that the switch-off time can be set to a time-invariable optimum value in order to ensure the intermittent operation.

This optimum value should be chosen such that the switch-off time is as short as possible, but still ensures intermittent operation. In the most favorable case, the term mentioned here is quasi-transient operation which, according to the invention, is preferably chosen such that the currentless time at the end of the switch-off time before a new switch-on phase of the switching transistor amounts to at most 10% of the period duration, that is to say of the reciprocal operating frequency of the SEPIC converter.

On the other hand, the switch-on time of the switching transistor can be used to adapt the charging operation of the inductances in such a way that an essentially constant output quantity, in particular output voltage, can nevertheless be made available under varying charging conditions on account of mains power supply voltage fluctuations or similar interference.

In addition to avoiding the line-conducted interference in the case of a fixed-frequency control circuit, an optimization of the "utilization" of the inductances is thus produced as a result of the optimization of the switch-off time. A maximum value depending on the lowest permissible supply voltage and the lamp can be chosen for the switch-on time.

The regulating circuit used is preferably digital and regulates the SEPIC converter in time-discrete fashion. In this case, the intervals between the regulating operations are preferably at least half a period of the AC supply voltage, in respect of which reference is made to the prior application "Operating device for a lamp with a SEPIC converter" of Jan. 24, 2001 from the same applicant. This application bears the file reference 101 10 239.9.

To put it briefly, this exploits the property of a SEPIC converter whereby a sufficiently good power factor can be achieved in intermittent operation in the case of a constant duty ratio—apart from the regulation to the output quantity—between switch-on time and switch-off time. In this case, then, the duty ratio is not tracked to the instantaneous mains power supply voltage, but rather is merely regulated according to the output quantity as regulated variable. Regulating intervals of a time-discrete regulation of at least half the mains power supply period are therefore sufficient. The AC supply voltage cannot be tracked with such regulating intervals. The advantage resides in the less stringent requirements made of the regulating circuit and the saving possibilities thus obtained.

A preferred application of the invention is to provide an electronic operating device for a plurality of lamp types. Said operating device has a programmable control circuit with a memory with operating parameters for said lamp types. In particular, the programmable control circuit also contains the regulating circuit for the control circuit of the SEPIC converter and can adapt the latter to the corresponding parameters of the lamp, that is to say set it for example to the desired output voltage taking account of the lamp impedance. The control circuit of the SEPIC converter can then set parameters adapted to the specific lamp type that is detected by the operating device or communicated to it at the beginning of operation, for instance the switch-off time, the range of selectable switch-on times and the frequency. In particular, it is preferred in this case for the operating device to automatically identify a newly connected lamp at the beginning of operation of said lamp.

Furthermore, it is preferred for the operating device to perform, at the beginning of operation, an automatic adjustment to the specific parameters in the context of customary component fluctuations prescribed by the mounted components. As a result, the requirements made of the component selection can be kept in a cost-effective framework and precise optimized operation can be ensured at the same time. This aspect applies, moreover, both to multitype operating devices and to operating devices designed only for one specific lamp type.

Finally, in many cases the operating device has an oscillator, which is preferably controlled by the same regulating circuit which also controls the SEPIC converter. In particular, the entire operating device can be controlled by a single digital IC.

The preferred area of application is for operating devices for low-pressure gas discharge lamps. The oscillators used in this case are preferably half-bridge oscillators with external control by the abovementioned IC.

BRIEF DESCRIPTION OF THE DRAWINGS

The individual aspects of the invention are explained in more detail below using an exemplary embodiment. Individual features disclosed in the process may also be essential to the invention in other combinations. As a precaution, it is furthermore stated that the description above and the description below are to be understood equally with regard to an operating method.

BEST MODE FOR CARRYING OUT THE INVENTION

Figure 1:
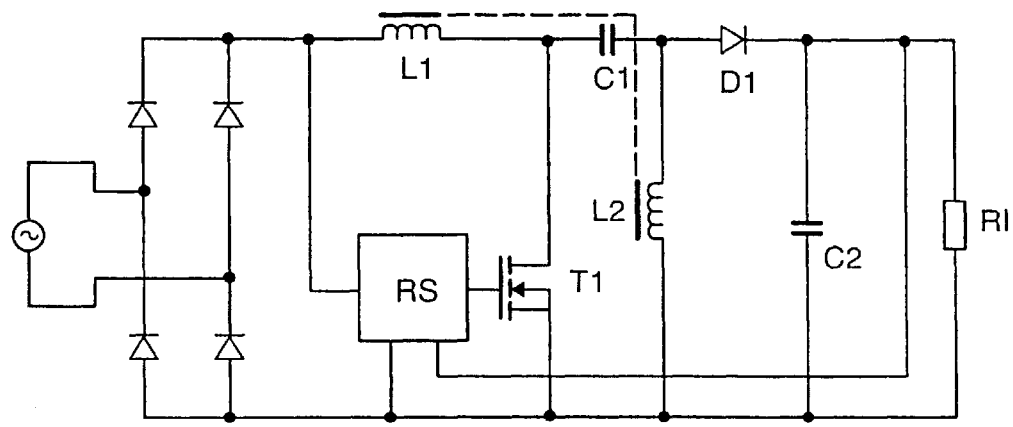
FIG. 1 shows a schematic block diagram of an operating device according to the invention.

FIG. 1 illustrates an operating device according to the invention as an exemplary embodiment. It can be seen on the left that an AC supply voltage, for example a customary domestic mains power supply voltage, is rectified via a diode rectifier bridge. Thus, in the figure there is a rectified positive potential in the line branch running horizontally at the top and a rectified negative potential at the bottom, which is generally connected to ground. The rectified AC voltage forms the input of a SEPIC converter, which has the coils (inductances) L1 and L2, the capacitor C1, the rectifier diode D1 and the switching transistor T1 and is regulated by the regulating circuit RS. A load RI is connected to the SEPIC converter output depicted on the right, that is to say in parallel with a storage capacitor C2, which load is supplied with a DC voltage made available by the capacitor C2. The load RI is a customary half-bridge oscillator with two switching transistors for generating a high-frequency AC voltage which can be used to operate a low-pressure gas discharge lamp. Since such circuits are prior art and generally known, the load is represented here merely by a resistor.

The capacitor C2 serves as storage capacitor and has to be charged to an as far as possible constant DC voltage from the rectified AC voltage by the SEPIC converter. In this case, the current consumption from the mains power supply is intended to be tracked to the sinusoidal profile of the mains power supply voltage in a manner as free as possible from interference.

Through alternating switching operation of the switching transistor T1, the coil L1 is charged to a specific current from the rectified mains power supply voltage in the switched-on state and discharged into the capacitor C1 in the switched-off state of the switching transistor T1. Equally, the coil L2 is charged in the switch-on times of the switching transistor Ti and discharged into the storage capacitor C2 in the switch-off times. (The polarity of the diode D1 must be taken into consideration.) In this case, so-called intermittent operation results if the switch-off times of the switching transistor T1 are long enough that the current in the rectifier diode D1 falls to zero. In this case, on average the capacitor C1 remains charged essentially at the value of the instantaneous rectified supply voltage. This in turn means that the storage capacitor C2, in the switch-off times, is charged merely with the induced voltage generated by the coil L2. Through a corresponding duty ratio, that is to say ratio between the switch-on times and switch-off times, and taking account of the load RI, it is thus possible to establish essentially any desired DC voltage across the capacitor C2, which may be, in particular, smaller than the amplitude of the mains power supply voltage. Thus, the storage capacitor C2 need not necessarily be a capacitor that is particularly resistant to high voltages. The capacitor C1 provides, as it were, for a decoupling between the two coils L1 and L2, so that, in contrast to the step-up converter, the voltages generated by the coil L1 are not added to the instantaneous mains power supply voltage.

The switch-on times and switch-off times together produce a period duration and thus an operating frequency given by the switching operation of the switching transistor T1 and thus by the regulating circuit RS. A typical operating frequency lies in the range from a few tens of kHz to about 200 kHz.

Figure 2:
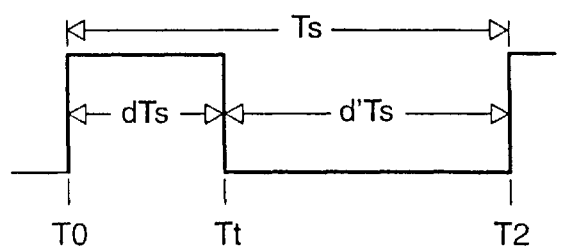
FIG. 2 illustrates the switch-on time and the switch-off time of the switching transistor from FIG. 1 in a timing diagram.

The switching states are symbolized in FIG. 2. In this case, $dT_s$ denotes the switch-on time and $d'T_s$ denotes the switch-off time. The two are added to form the period duration $T_s$, which extends from an instant T0 to an instant T2. At the instant Tt, the switching transistor T1 opens and so the switch-on time ends and the switch-off time begins. The intermittent operation that has been mentioned repeatedly is distinguished by the fact that a currentless state of the rectifier diode D1 is produced at least at the end of the switch-off time $d'T_s$, that is to say shortly before the instant T2 depicted in FIG. 2. This currentless state is preferably as short as possible, in the region of 5–10% of the period length $T_s$ in the present case.

It can be seen in FIG. 1 that the regulating circuit RS has four terminals, two of which tap off the rectified mains power supply voltage at the output of the rectifier bridge. A further terminal measures the output voltage, that is to say the DC voltage across the storage capacitor C2, which feeds the half-bridge oscillator. The fourth terminal controls the control electrode of the switching transistor Ti, which is either a MOSFET or an IGBT. In this case, the regulating circuit RS regulates the switching operation of the switching transistor T1 with regard to a stability of the output voltage across the storage capacitor C2 as regulated variable. According to the invention, the manipulated variable is the switch-on time $dT_s$ or, to put it another way, the period duration $T_s$ in conjunction with a constant switch-off time $d'T_s$.

In this case, the desired output voltage is prescribed as regulated variable by a control circuit of the entire operating device, which is additionally responsible for the operation of the half-bridge oscillator. This control circuit has sets of parameters for different lamp types, which are set upon the connection of a lamp by the identification of the lamp type and read-out of the corresponding parameters. Accordingly, the regulating circuit selects an output voltage suitable for the lamp type. Moreover, different mains power supply input voltages can be taken into consideration in this case, so that overall a wide-range input operating device is involved.

By virtue of the depicted tapping-off of the rectified mains power supply voltage, the regulating circuit RS can limit the maximum power that is output.

Moreover, a so-called microcontroller (programmable control circuit) is used for the control circuit with the regulating circuit RS, in which case the regulation with the period duration $T_s$ or the switch-on time $dT_s$ as manipulated variable can be realized comparatively simply.

On account of the relatively long regulating intervals owing to the extensive frequency stability of the SEPIC converter operation (in contrast to the frequency tracking in a step-up converter), the computational effort that is to be effected by the microcontroller is comparatively small.

The advantage of the invention resides first of all in the fact that the mains power supply fluctuations that occur regularly in the case of mains power supply lead to corresponding adaptations of the operating frequency or period duration $T_s$ and thus modulate the frequency of the line-conducted interference of the operating device.

If the instantaneous mains power supply voltage amplitude falls, then the switch-on time $dT_s$ is correspondingly lengthened in order to obtain the same current in the coils L1 and L2. Conversely, the switch-on time $dT_s$ is increased when the mains power supply voltage amplitude rises. In this case, the discharge time within the switch-off time $d'T_s$ remains essentially constant.

The outlay for interference suppression overall can be significantly reduced on account of the reduced line-conducted interference or the frequency shifts thereof. As a result, the relevant standards can be satisfied and savings can be made at the same time.

Secondly, the switch-off time $d'T_s$ can be optimized as a fixed quantity, consideration being given, of course, to the corresponding set of parameters of the lamp type, in particular to the desired output voltage and impedance of the load RI. This is because the regulation to the output voltage as regulated variable means that the discharge operations of the two coils L1 and L2 during the switch-off times $d'T_s$ are subjected to constant conditions. The intermittent operation can thus be set "very tight", namely as quasi-transient operation. In this respect, the coils L1 and L2 must not be overdimensioned.

The coupling of the two coils as depicted in FIG. 1 is not of essential importance to the invention and belongs to the customary measures in the optimization of SEPIC converters. The coupling serves in particular for radio interference suppression and is not explained in detail here.

What is claimed is:

1. Electronic operating device for lamps, which is designed for supply with AC voltage and has:
    a storage capacitor (C2),
    a SEPIC converter (L1, L2, C1, T1, D1) for charging the storage capacitor (C2) from the AC voltage to a DC voltage in the case of an operating device current consumption which is essentially tracked to the AC voltage waveform with an operating frequency, and
    a regulating circuit (RS) for regulating the SEPIC converter to an output quantity,
    characterized in that the regulating circuit (RS) alters the operating frequency of the SEPIC converter (L1, L2, C1, T1, D1) during regulation.

2. The operating device as claimed in claim 1, in which the switch-on time (dTs) of a switching transistor (T1) of the SEPIC converter (L1, L2, C1, T1, D1) which occurs in the periods of the operating frequency is altered during the regulation of the SEPIC converter (L1, L2, C1, T1, D1).

3. The operating device as claimed in claim 2, in which the switch-off time ($d'T_s$) of a switching transistor (T1) of the SEPIC converter (L1, L2, C1, T1, D1) which occurs in the periods ($T_s$) of the operating frequency remains constant during the regulation of the SEPIC converter (L1, L2, C1, T1, D1).

4. The operating device as claimed in claim 3, which is designed for quasi-transient operation of the SEPIC converter (L1, L2, C1, T1, D1) with currentless times—occurring in the periods ($T_s$) of the operating frequency—of in each case at most 10 % of the period duration ($T_s$).

5. The operating device as claimed in claim 3, in which the regulating circuit (RS) is a digital circuit and the operating frequency of the SEPIC converter (L1, L2, C1, T1, D1) is regulated in time-discrete fashion.

6. The operating device as claimed in claim 5, in which the regulating intervals of the time-discrete regulation are at least as long as half the period of the AC voltage.

7. The operating device as claimed in claim 3, which is suitable for a plurality of lamp types and has a programmable control circuit with a memory with operating parameters of the lamp types, the programmable control circuit concomitantly comprising the regulating circuit for regulating the SEPIC converter.

8. The operating device as claimed in claim 7, which is designed in such a way that an automatic initial setting to individual parameters of the mounted components (L1, L2, C1, C2, T1, D1) is effected at the beginning of the operation.

9. The operating device as claimed in claim 7, having an oscillator, which is controlled by the programmable control circuit and is supplied with DC voltage power by the storage capacitor (C2).

10. The operating device as claimed in claim 1, which is designed for quasi-transient operation of the SEPIC converter (L1, L2, C1, T1, D1) with currentless times—occurring in the periods ($T_s$) of the operating frequency—of in each case at most 10 % of the period duration ($T_s$).

11. The operating device as claimed in claim 1, in which the regulating circuit (RS) is a digital circuit and the operating frequency of the SEPIC converter (L1, L2, C1, T1, D1) is regulated in time-discrete fashion.

12. The operating device as claimed in claim 4, in which the regulating intervals of the time-discrete regulation are at least as long as half the period of the AC voltage.

13. The operating device as claimed in claim 1, which is suitable for a plurality of lamp types and has a programmable control circuit with a memory with operating parameters of the lamp types, the programmable control circuit concomitantly comprising the regulating circuit for regulating the SEPIC converter.

14. The operating device as claimed in claim 13, which is designed in such a way that an automatic initial setting to individual parameters of the mounted components (L1, L2, C1, C2, T1, D1) is effected at the beginning of the operation.

15. The operating device as claimed in claim 13, having an oscillator, which is controlled by the programmable control circuit and is supplied with DC voltage power by the storage capacitor (C2).

16. The operating device as claimed in claim 1, which is designed for supplying a low-pressure gas discharge lamp.

* * * * *